United States Patent [19]

Ostlinning et al.

[11] Patent Number: 4,500,702

[45] Date of Patent: Feb. 19, 1985

[54] ANHYDROUS PREPARATION OF POLYARYLENE SULFIDE IN ONE VESSEL REACTION SYSTEM

[75] Inventors: Edgar Ostlinning, Duesseldorf; Karsten Idel, Krefeld, both of Fed. Rep. of Germany

[73] Assignee: Bayer Aktiengesellschaft, Leverkusen, Fed. Rep. of Germany

[21] Appl. No.: 550,871

[22] Filed: Nov. 14, 1983

[30] Foreign Application Priority Data

Nov. 23, 1982 [DE] Fed. Rep. of Germany ....... 3243189

[51] Int. Cl.³ .............................................. C08G 75/14
[52] U.S. Cl. ..................................... 528/388; 528/377
[58] Field of Search ................................. 528/388, 377

[56] References Cited

U.S. PATENT DOCUMENTS

| | | | |
|---|---|---|---|
| 4,038,259 | 7/1977 | Campbell et al. | 528/388 |
| 4,038,263 | 7/1977 | Edmonds et al. | 528/388 |
| 4,039,518 | 8/1977 | Campbell | 528/388 |
| 4,116,947 | 9/1978 | Edmonds et al. | 528/388 |
| 4,424,339 | 1/1984 | Idel et al. | 528/388 |
| 4,433,138 | 2/1984 | Idel et al. | 528/388 |

*Primary Examiner*—Harold D. Anderson
*Attorney, Agent, or Firm*—Connolly and Hutz

[57] ABSTRACT

This invention relates to a process for the production of high molecular weight, optionally branched polyarylene sulphides. These polyarylene sulphides may be produced in a polar organic solvent in the absence of water in a one-vessel reaction.

13 Claims, No Drawings

ANHYDROUS PREPARATION OF POLYARYLENE SULFIDE IN ONE VESSEL REACTION SYSTEM

This invention relates to a process for the production of high molecular weight, optionally branched polyarylene sulphides. They may be produced in a polar organic solvent in the absence of water in a one-vessel reaction.

Polyarylene sulphides are known, as is their production (see, for example US-PS Nos. 2,513,188; 3,117,620; 3,354,129; 3,524,835; 3,790,536; 3,839,301; 4,048,259; 4,038,260; 4,038,261; 4,038,262; 4,056,515; 4,060,520; 4,064,114; DE-AS 2,453,485; 2,453,749, DE-OS Nos. 4,116,947; 2,623,362; 4,282,347; 2,623,363, 2,623,333, 2,930,797; 2,930,710; 3,019,732, 3,030,488).

All these processes use starting materials which have to be at least partly dehydrated in an extra reaction step before they can be converted into polyarylene sulphides. Thus, for example, in the process according to DE-OS No. 3,030,488, alkali sulphides are used which have a water content of from 1 to 2.4 mols of water per mol of alkali sulphide. According to U.S. Pat. Nos. 4,056,515 and 4,060,520, water contents of 1 mol per mol of S donor and more remain in the reaction mixtures after the pre-dehydration step. In US-PS No. 4,282,347, water is added to the reaction mixture after the dehydration step to adjust to a particular water content.

It is considered to be particularly advantageous in all these processes not to have all the reaction components present during dehydration. In particular, the halogen aromatic compounds are only added together with some of the solvent after a pre-dehydration step.

In contrast thereto, it has now been found that it is particularly advantageous to introduce all the reaction components at the beginning. This includes all catalysts and/or co-solvents which are to be used. They are reacted in a one-vessel reaction, and water is separated therefrom by azeotropical distillation. In this manner, it is possible for the reaction mixture to be anhydrous.

The present invention provides a process for the production of optionally branched polyarylene sulphides from (a) 0 to 100 Mol %, preferably 50 to 100 Mol %, of dihalogen aromatic compounds corresponding to the formula

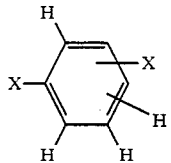 (I)

0 to 100 Mol %, preferably 0 to 50 Mol %, of dihalogen aromatic compounds corresponding to the formula

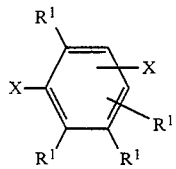 (II)

wherein
X represents meta or para-positioned chlorine or bromine relative to each other, and
$R^1$ is the same or different and may represent hydrogen, alkyl, cycloalkyl, aryl, alkylaryl, arylalkyl, and two ortho-positioned radicals $R^1$ relative to each other may be linked to form an aromatic or heterocyclic ring, and one radical $R^1$ is always different from hydrogen, and (b) from 0 to 5 mol %, preferably from 0.1 to 2.5 mol%, based on the total of the dihalogen aromatic compounds corresponding to formulae I and II, of a trior tetra-halogen aromatic compound corresponding to formula $$ArX_n \qquad (III),$$

wherein
Ar represents an aromatic or heterocyclic radical,
X represents chlorine or bromine, and
n represents 3 or 4, and (c) alkali sulphides, preferably sodium or potassium sulphide or the mixture thereof, preferably in the form of the hydrates thereof or aqueous mixtures, optionally together with alkali hydroxides, such as sodium- and potassium hydroxide, the molar ratio of (a+b):c ranging from 0.85:1 to 1.15:1, preferably from 0.95:1 to 1.05:1, in (d) an organic solvent, optionally with the simultaneous use of catalysts and/or co-solvents, characterised in that the molar ratio of alkali sulphides (c) to the organic solvent (d) ranges from 1:2 to 1:15, and the process is carried out in a one-vessel reaction with a reaction time of up to 24 hours, at a reaction temperature of from 160° to 270° C. preferably from 170° to 250° C., optionally under slight excess pressure, and water which distills off azeotropically is removed from the reaction mixture.

Conventional substances may be used as catalysts in conventional quantities, for example, alkali fluorides, alkali phosphates and alkali carboxylates. From 0.02 to 1.0 mols of catalyst are used per mol of alkali sulphide. N,N-dialkylcarboxylic acid amides of $C_1$–$C_8$ aliphatic and $C_6$–$C_{12}$ aromatic carboxylic acids may be used, for example as co-solvents in a quantity of from 0.02 to 1.0 mols, based on 1 mol of alkali sulphide.

$R^1$ in formula II preferably represents hydrogen, $C_1$–$C_{20}$ alkyl, $C_5$–$C_{20}$ cycloalkyl, $C_6$–$C_{24}$ aryl, $C_7$–$C_{24}$ alkylaryl or $C_7$–$C_{24}$ aralkyl. Furthermore, two ortho-positioned radicals $R^1$ relative to each other may form a condensed aromatic ring having a total of 6 carbon atoms, or a condensed heterocyclic ring having from 5 to 6 ring atoms and from 1 to 3 heteroatoms such as N, O and S.

Ar preferably represents an aromatic radical having from 6 to 24 carbon atoms or a heterocyclic radical having from 6 to 24 ring atoms, more preferably an aromatic ring having from 6 to 10 carbon atoms or an heterocyclic radical having from 6 to 10 ring atoms, and the heterocyclic radicals may contain up to 3 heteroatoms, such as N, S and O.

Alkali sulphides are used in conventional quantities and in a conventional manner. For example, lithium, sodium, potassium and rubidium sulphide are suitable, preferably sodium and potassium sulphide. Alkali sulphides which are regenerated from hydrogen sulphides with alkali hydroxides, such LiOH, NaOH and KOH may be used. In any case, mixtures of the sulphides and of the hydroxides may be used.

According to the present invention, meta- and para-dihalogen aromatic compounds corresponding to formula (I) or (II) may be used. In this case, the ratio of meta- to para- dihalogen aromatic compounds may be up to 30:70.

The process may be carried out under a slight excess pressure of up to 8 bars.

To obtain polyphenylene sulphides which are thermoplastically processible, p-dihalogen aromatic compounds are more preferably used.

If branched polyarylene sulphides are to be produced, at least 0.05 mol % of a tri- or tetra-halogen aromatic compound corresponding to formula (III) must be used.

Examples of dihalogen aromatic compounds corresponding to formula (I) to be used according to the present invention include the following: p-difluorobenzene, p-diclorobenzene, p-dibromobenzene, p-diiodobenzene, 1-fluoro-4-chlorobenzene, 1-fluoro-4-bromobenzene, 1- chloro-4-bromobenzene, 1-chloro-4-iodobenzene, 1-bromo-4-iodobenzene, 1,3-difluorobenzene, 1,3-dichlorobenzene, 1,3-dibromobenzene, 1,3-diiodobenzene, 1-fluoro-3- chlorobenzene, 1-fluoro-3-bromobenzene, 1,-fluoro-3- iodobenzene, 1-chloro-3-bromobenzene, 1-chloro-3-bromobenzene,1-chloro-3-iodobenzene and 1- bromo-3-iodobenzene. They may be used on their own or mixed together. 1,4-dichlorobenzene and/or 1,4-dibromobenzene are particularly preferred.

Examples of dihalogen aromatic compounds corresponding to formula (II) which may be used according to the present invention include the following: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,5-dichlorobenzene, 1-cyclohexyl- 2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromo benzene, 1-hexyl-2,5-dichlorobenzene, 2,4-dichlorotoluene, 2,4-dichloroxylene, 2,4-dibromocumene, 1-cyclohexyl-3,5-dichlorobenzene and 1-phenyl-3,5-difluoro-benzene. They may be used on their own or mixed together.

Examples of tri- or tetra-halogen aromatic compounds corresponding to formula (III) which may be used according to the present invention include the following: 1,2,3-trichlorobenzene, 1,2,4-trichlorobenzene, 1,2,4- tribromobenzene, 1,2,4-triiodobenzene, 1,3,5-trichloro2,4,5-trimethylbenzene, 1,2,3-trichloronaphthalene, 1,2,4-trichloronaphthalene, 1,2,6-trichloronaphthalene, 2,3,4-trichlorotoluene, 2,3,6-trichlorotoluene, 1,2,3,4-tetrachloronaphthalene, 1,2,4,5-tetrachlorobenzene, 2,2'-4,4'-tetrachlorobiphenyl and 1,3,5-tri-chlorotriazine.

Organic solvents which are suitable for use in the present invention include the following: N-alkyllactams, for example N-methylpyrrolidone, N-ethyl pyrrolidone, N-methylpiperidone, N-isopropylpyrrolidone, N-methylcaprolactam or other polar organic solvents in which the reaction components at least partly dissolve, and the boiling point of which is above 200° C.

The reaction may last up to 24 hours, and preferably lasts from 2 to 18 hours.

The reaction is generally carried out under atmospheric pressure. In particular cases, it may be advantageous to use an excess pressure of from 0.1 to 8 bars.

When carrying out the process of the present invention all the components may be admixed and they may be added to the reaction mixture in any sequence. The reaction mixture may then be heated to a temperature of from 160° to 270° C., preferably from 170° to 250° C. The reaction according to the present invention may thus be carried out as a one-vessel reaction. During heating of the reaction mixture and during the reaction, the water which distills off azeotropically from the mixture with the halogen aromatic compound may be separated, for example, by means of a water separator. Water may be removed in this manner for the duration of the reaction.

The operations of working up the reaction mixture and of isolating the polyarylene sulphides may be carried out by conventional methods.

The polyarylene sulphides may be directly separated from the reaction solution or they may be separated, once water and/or dilute acids have been added, by conventional methods, such as filtration or centrifugation. A wash with water generally follows the separation of the polyarylene sulphide. A wash of extraction with other washing liquids may also be carried out in addition to or subsequent to this wash.

The polyarylene sulphide may also be obtained by distilling off the solvent and then by washing, as described above.

The polyarylene sulphides according to the present invention may be mixed with other polymers, such as pigments and fillers, for example graphite, metal powder, glass powder, quartz powder or glass fibres, or they may be mixed with additives conventional for polyarylene sulphides, for example conventional stabilizers or mould-release agents.

The melt flow behaviour of polyarylene sulphides is generally measured according to ASTM 1238-70 at 316° C. using a 5 kg weight, and is expressed in g/10 minutes.

However, in the case of high melt flow values, this measurement may present difficulties because of the high outflow rate of the polymer melt.

Therefore, the melt viscosity $\eta m$ of the polymer melt was determined (in Pa.s) at 306° C. depending on the shearing strain (in Pa.s) using an Instron-Rotation-viscosimeter.

In this way, it is possible to determine the melt viscosity within a very wide range of from $10^{-1}$ to $10^7$ Pa.s. In an Instrom Rheometer, the polymer is melted between a fixed plate and a rotatable cone and the torque of the cone is determined. The melt viscosity may be calculated from the torque, the angular velocity and the data of the apparatus, depending on the shearing strain. A Rheometer model 3250 manufactured by Instron was used. Both the diameters of the cone and of the plate are 2 cm.

The melt viscosity which is measured under a shearing strain $\tau = 10^2$ Pa is stated.

Directly after being isolated from the reaction mixture, the polyarylene sulphides according to the present invention, preferably the p-polyarylene sulphides generally have melt viscosities of from $0.3 \times 10^3$ to $5 \times 10^5$ Pa.s or higher, preferably melt viscosities of from $1.5 \times 10^3$ to $10^4$ Pa.s, and they have good colouring properties. They may be directly processed into films, mouldings or fibres by extrusion, extrusion blowing, injection moulding or by otherwise conventional processing techniques. These products may be used in a conventional manner, for example as car parts, armatures, electronic parts, such as switches, electronic boards, chemical-resistant and weathering-stable parts and apparatus, such as pump housings and pump impellers, etching bath trays, sealing rings, parts of office machines and communication equipment, as well as household gadgets, valves and ball bearing parts.

COMPARATIVE EXAMPLE 1

Production of polyphenylene sulphide according to US-PS No. 3,354,119

129 g of sodium sulphide trihydrate ( 1 mol of Na$_2$S) and 300 g of N-methylpyrrolidone were introduced together into a stirrer-equipped autoclave. The mixture was flushed with nitrogen and slowly heated to 202° C. A total of 19 ml of water distilled off during this operation (which corresponds to a residual water content of 1.78 mols, based on sodium sulphide). The mixture was then cooled to about 160° C., and 147 g of p-dichlorobenzene 1 mol) in about 50 g of methylpyrrolidone were added. The reaction mixture is heated to 245° C. over a period of 30 minutes under a nitrogen preliminary pressure of 2.5 bars and this temperature is maintained for 3 hours. A final pressure of 14.5 bars is attained. After cooling to room temperature, a grey solid substance is isolated which is then washed with water. It is dried under vacuum at 80° C., and 100.3 g 93 %) of poly-p-phenylene sulphide are obtained which is light brown in colour and has the following characteristic data: melt viscosity $\eta m = 4.5$ Pa.s (at $\tau = 10^2$ Pa).

Thermoplastic processing is impossible without hardening.

COMPARATIVE EXAMPLE 2

Like Comparative Example 1, but 1.81 g of 1,2,4-trichlorobenzene ( 1 mol %, based on dichlorobenzene) were also added to p-dichlorobenzene and the reaction was carried out under normal pressure. 48.9 g of light grey product ( 45.3 % yield, based on Na$_2$S) having a melt viscosity of $\eta m < 1$ Pa.s (at $\tau = 10^2$ Pa) were isolated.

EXAMPLE 1

1110 g of N-methylcaprolactum, 305.2 g of sodium sulphide hydrate ( 2.32 mols), 28.0 g of 50 % sodium hydroxide, 341.1 g of 1,4-dichlorobenzene ( 2.32 mols), 4.21 g of 1,2,4-trichlorobenzene (1 mol %, based on dichlorobenzene) and 30.2 g of N,N-dimethylactamide (15 mol %, based on Na$_2$S) are introduced under nitrogen into a 2 liter three-necked flask, equipped with a thermometer, a stirrer and a column having a ditillate separator. The reaction mixture is slowly heated to boiling point. Water is removed from the distilling azeotrope, as water and p-dichlorobenzene, and p-dichlorobenzene is returned into the reaction vessel. After 2 hours water can no longer be detected in the distillate or in the sump. The mixture is refluxed for a further 9 hours, and the product is isolated in the conventional manner. 236.8 g of white polyarylene sulphide are obtained ( 94.5 % yield, based on Na$_2$S, melt viscosity of $\eta m = 3.0 \times 10^3$ Pa.s (at $\tau = 10^2$ Pa.))

EXAMPLE 2

Analogous to Example 1: 1110 g of N-methylcaprolactam, 305.2 g of sodium sulphide hydrate ( 2.32 mols), 2.4 g of 50 % sodium hydroxide, 341.1 g of 1,4-dichlorobenzene ( 2.32 mols) and 38.05 g of sodium acetate ( 20 mol %, based on Na$_2$S). 233.4 g of white polyphenylene sulphide are obtained ( 93.1 %, melt viscosity of $\eta m = 120$ Pa.s ($\tau = 10^2$ Pa).

EXAMPLE 3

(Production of a branched polyarylene sulphide)

Analogous to Example 1: 1110g N-methylpyrrolidone, 305.2g of sodium sulphide hydrate ( 2.32 mols), 28.0 g of 50 % sodium hydroxide, 324.1 g of 1,4-dichlorobenzene ( 95 mol %, based on Na$_2$S), 19.5 g of 1,2,4-trichlorobenzene ( 4.87 mol %, based on 1,4-dichlorobenzene) and 30.2 g of N,N-dimethyl acetamide. 154.8 g of white polyarylene sulphide are obtained ( 61.8% yield, melt viscosity of $\eta m = 5.9 \times 10^6$ Pa.s (at $\tau = 10^2$ Pa).

EXAMPLE 4

(Production of a branched polyarylene sulphide)

Analogous to Example 2, but also 4.21 g of 1,2,4-trichlorobenzene, but without sodium acetate. 232.7 g of white polyarylene sulphide are obtained ( 92.8% yield, melt viscosity of $\tau m = 4.7 \times 10^2$ Pa.s (at $\tau = 10^2$ Pa).

We claim:

1. A process for the production of high molecular weight polyarylene sulphide under anhydrous conditions from (a) 100 to 0 Mol % of dihalogen aromatic compound corresponding to the formula

and from 0 to 100 Mol % of dihalogen aromatic compound corresponding to the formula

wherein

X represents meta- or para-positioned chlorine or bromine relative to each other, and R$^1$ is the same or different and represents hydrogen, alkyl, cyloalkyl, aryl, alkylaryl, arylalkyl, and two orthopositioned radicals R$^1$ relative to each other are linked together through a N, O or S atom to form an aromatic ring or linked together through a N, O or S atom to form a heterocyclic ring, and one R$^1$ is different from hydrogen, and from 0 to 5 mol %, based on the total of components (a) and (b), of a tri- or tetra-halogen aromatic compound corresponding to the formula

ArX$_n$     (III), wherein

Ar represents an aromatic or heterocyclic radical,

X represents chlorine or bromine, and n represents 3 or 4, and (c) at least one alkali sulphide the molar ratio of (a+b):c ranging from 0.85 to 1.15:1, and (d) an organic solvent with the molar ratio of alkali sulphide (c) and organic solvent (d) ranging from 1:2 to 1:15, and wherein the process is conducted in a one-vessel reaction and water which distills off azeotropically is removed from the reaction mixture.

2. A process according to claim 1 wherein the time of the reaction is up to 24 hours.

3. A process according to claim 1 wherein the reaction temperature of from 170° to 270° C.

4. A process according to claim 1 wherein the high molecular weight polyarylene sulphide is branched.

5. A process according to claim 1 wherein component (c) additionally contains at least one alkali hydroxide.

6. A process according to claim 1 wherein component (d) also contains a catalyst.

7. A process according to claim 6 wherein the catalyst is alkali carboxylate.

8. A process according to claim 1 wherein component (d) also contains at least one co-solvent.

9. A process according to claim 8 wherein the co-solvent is N,N-dialkyl carboxylic acid amide.

10. A process according to claim 1 wherein N-methylpyrrolidone-(2) is the organic solvent.

11. A process according to claim 1 wherein N-methyl-ω-caprolactam is the polar organic solvent.

12. A process according to claim 1 wherein 1,4-dichlorobenzene is the dihalogen atomatic compound corresponding to formula (I).

13. A process according to claim 1 wherein 1,2,4-trichlorobenzene is the polyhalogen aromatic compound corresponding to formula (III).

* * * * *